United States Patent
Yang et al.

(10) Patent No.: US 10,444,463 B2
(45) Date of Patent: Oct. 15, 2019

(54) OPTICAL LENS ASSEMBLY FOR VEHICULAR OPTICAL IMAGING SYSTEM

(71) Applicant: Ningbo Sunny Automotive Optech Co., Ltd., Ningbo, Zhejiang (CN)

(72) Inventors: Jia Yang, Ningbo (CN); Heteng Zhang, Ningbo (CN)

(73) Assignee: Ningbo Sunny Automotive Optech Co., Ltd., Yuyao, Zhejiang (CN)

(*) Notice: Subject to any disclaimer, the term of this patent is extended or adjusted under 35 U.S.C. 154(b) by 0 days.

(21) Appl. No.: 15/384,276

(22) Filed: Dec. 19, 2016

(65) Prior Publication Data

US 2017/0176706 A1 Jun. 22, 2017

(30) Foreign Application Priority Data

Dec. 17, 2015 (CN) .......................... 2015 1 0951912

(51) Int. Cl.
*G02B 7/02* (2006.01)

(52) U.S. Cl.
CPC .............. *G02B 7/021* (2013.01); *G02B 7/02* (2013.01); *G02B 7/026* (2013.01)

(58) Field of Classification Search
CPC .......... G02B 7/02; G02B 7/021; G02B 7/026
USPC ......................... 359/819, 811, 513, 507, 808
See application file for complete search history.

(56) References Cited

U.S. PATENT DOCUMENTS

| | | | | |
|---|---|---|---|---|
| 6,310,735 B1* | 10/2001 | Best | ...................... | G02B 7/026 359/819 |
| 6,900,953 B2* | 5/2005 | Okumura | ............... | G02B 7/026 353/100 |
| 7,652,831 B2* | 1/2010 | Watanabe | .............. | G02B 7/021 359/811 |
| 8,675,127 B2* | 3/2014 | Nakajima | ............ | H04N 5/2253 348/359 |
| 9,235,107 B2* | 1/2016 | Han | ......................... | G02B 7/02 |
| 9,692,952 B2* | 6/2017 | Han | ......................... | G02B 7/02 |
| 10,257,398 B2* | 4/2019 | Park | ......................... | G02B 7/04 |
| 2006/0238892 A1* | 10/2006 | Lippert | .................. | G02B 7/021 359/692 |
| 2007/0258006 A1* | 11/2007 | Olsen | ..................... | G02B 7/021 348/345 |
| 2009/0225455 A1* | 9/2009 | Kawasaki | .............. | G02B 7/007 359/830 |
| 2013/0176633 A1* | 7/2013 | Sun | ......................... | G02B 7/02 359/811 |
| 2014/0016215 A1* | 1/2014 | Akutsu | .................. | G02B 7/006 359/811 |
| 2014/0218813 A1* | 8/2014 | Araki | ..................... | G02B 7/021 359/819 |

(Continued)

*Primary Examiner* — William R Alexander
(74) *Attorney, Agent, or Firm* — Raymond Y. Chan; David and Raymond Patent Firm

(57) ABSTRACT

An optical lens assembly is disclosed, which including a lens unit and a holder, wherein the lens unit includes at least a front lens and a rear lens, and the holder includes a positioning portion and a holding portion extended downwardly the positioning portion, wherein the positioning portion and the holding portion are integrated with each other, wherein the holding portion forms a light chamber for holding the lens unit therein, wherein the light chamber allows imaging lights to enter thereinto and pass through the lens unit, wherein the positioning portion is sealed on the outer surface of the front lens along the outer periphery of the front lens.

10 Claims, 14 Drawing Sheets

(56) References Cited

U.S. PATENT DOCUMENTS

2017/0104903 A1* 4/2017 Warashina .............. G02B 7/04

* cited by examiner

A) molding integrally a holder and a base, wherein the holder forms a positioning portion, a receiving portion extended downwardly from the positioning portion and a base extended downwardly and outwardly from the receiving portion, wherein the receiving portion defines an optical chamber for receiving the lens unit of the optical lens assembly therein, wherein the optical chamber allows the imaging light to enter into and pass through the lens unit B) arranging the lens unit in the optical chamber of the holder from bottom to top and pressing an outer surface of the front lens of the lens unit against on the positioning portion C) sealing at least one holding portion on an outer surface of the rear lens of the lens unit of the optical lens assembly therein, so as to retaining the lens unit in the optical chamber of the holder of the optical lens assembly. In other words, the holder of the optical lens assembly further comprises at least one holding portion provided on an inner wall of the optical chamber to hold the lens unit in the optical chamber of the holder of the optical lens assembly. Preferably, the holding portion is integrally extended inwardly and downwardly from the inner wall of the optical chamber D) providing sealedly a casing on the outer surface of the holder to make the holder be shield in the casing

Fig.6

A) molding integrally a holder, wherein the holder forms a positioning portion, a receiving portion extended downwardly from the positioning portion, a base extended downwardly and outwardly from the receiving portion and at least one holding portion, wherein the receiving portion defines an optical chamber for placing the lens unit of the optical lens assembly therein, wherein the holding portion is extended from an inner wall of the optical chamber, wherein the optical chamber allows imaging light to enter into and pass through the lens unit

↓

B) placing the lens unit in the optical chamber of the holder from bottom to top and pressing sealedly an outer surface of the rear lens of the lens unit against on the holding portion

↓

C) fusing thermally the positioning portion of the holder of the optical lens assembly to form a positioning ring and positioning sealedly the positioning ring on an outer surface of the front lens along the outer periphery of the front lens of the lens unit of the optical lens assembly so that the lens unit is sealedly and stably held between the positioning ring and the positioning portion of the holder

↓

D) sealing a casing on the outer surface of the holder to shield the holder in the casing

Fig.8

OPTICAL LENS ASSEMBLY FOR VEHICULAR OPTICAL IMAGING SYSTEM

CROSS REFERENCE OF RELATED APPLICATION

This is a non-provisional application that claims priority to a Chinese invention application, application number CN201510951912.1, filed Dec. 17, 2015. The entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to optical imaging, and more particularly to an optical lens assembly applied in a vehicular optical imaging system. The present invention further relates to a manufacturing method of locating a lens unit of the optical lens assembly at an appropriate position.

Description of Related Arts

In general, an optical lens and assembly for optical imaging and, in particular refractive imaging, comprises a lens (or a plurality of lenses) and a base, wherein the lenses allow imaging light to pass therethrough and enable it to be sensed by the sensor and obtaining an imaging photoelectric signal, wherein the base holds the lenses in place to ensure that the optical centers of and the lenses of the optical lens assembly are coaxial and the imaging light can be incident at a desired angle into the lenses. In addition, in order to avoid the and lenses of the lens assembly being directly exposed to the working environment, subject to environmental factors such as water, dust and other effects, thereby reducing the image quality, the existing optical lens assembly generally comprises a casing or a plurality of sealing member to seal the lens assembly. As a result, several problems to be solved in the industrial production of an optical lens assembly are to ensure that the optical axes of the lenses of the lens assembly are coaxial; secondly, to ensure that the light passing through each of the lenses of the lens assembly can be and sensed by the sensor. In other words, the lenses of the optical lens assembly for optical imaging defines an optical axis, and the base of the lens assembly defines a mechanical axis, and only when the mechanical axis and the optical axis are coincided with each other, the imaging light passes through the lenses of the lens assembly is sensed by the sensor to ideally image. Thirdly, as much as possible to improve the sealing effect, to ensure that the image quality is not affected by environmental moisture, dust and so on. In practical industrial production, it is difficult to ensure that the optical axes of the lenses of the optical lens assembly and the mechanical axis of the base of the optical lens assembly are completely overlapped due to and manufacturing and assembly and errors. In some applications, however, it is important to minimize the deviation between the optical axes of the lenses of the optical lens assembly and the mechanical axis of the base of the optical lens assembly to achieve better imaging. For example, in a vehicular optical imaging system, the imaging having a large error may lead to the deviation between the imaging image and the real road conditions, thus affecting the driver's judgment and driving the vehicle. Therefore, in order to obtain a better image quality, it is necessary to minimize the deviation between the optical axes of the lenses of the optical lens assembly and the mechanical axis of the base of the optical lens assembly to obtain high-quality imaging.

As shown in FIG. 1, the conventional optical lens assembly generally has an optical axis A formed by the lenses 1 of the optical lens assembly and a mechanical axis B formed by the fixing base 2 of the optical lens assembly, wherein the fixing base 2 comprises a lens barrel 3, a base 4, a ring 5 and a casing 6, wherein the lenses 1 of the optical lens assembly is preset in the lens barrel 3, and the lens barrel 3 is further provided on the base 4 of the fixing base 2. In addition, in order to hold the lens barrel 3 in a proper position, the fixing base 2 of the optical lens assembly further comprises a pressing ring 5 provided between the casing 6 and the lens barrel 3, wherein the pressing ring 5 is disposed on an outer surface of the lenses 1 so as to locate the lens barrel 3 on the base 4 and coincide the optical axis A of the lenses 1 of the optical lens assembly with the mechanical axis B of the fixing base 2 of the optical lens assembly. In order to seal and prevent water vapor from entering the interior of the optical lens assembly and affecting imaging, the existing optical lens assembly further comprises at least one sealing member (or sealing ring) disposed between the casing 6 and the pressing ring 5 (or base 4) to seal the gap between the casing 6 and the pressing ring 5. That is, the conventional optical lens assembly includes a plurality of independent components and requires a plurality of process steps to assemble and obtain an optical lens assembly having a complete structure. However, the excessive process steps inevitably bring about greater error, and it is difficult to coincide the optical axis A of the lenses 1 of the optical lens assembly with the mechanical axis B of the fixing base 2 of the optical lens assembly. In addition, the excessive process steps further lead to the result that the mechanical axes B of the fixing base 2 of the different optical lens assemblies have different positions, even if they are produced by the same process steps, which further increases the difficulty in coinciding the optical axis A of the lenses 1 of the optical lens assembly with the mechanical axis B of the fixing base 2 of the optical lens assembly. Thirdly, the nonuniformities among the different optical lens assemblies produced by the same process steps further results in difficulty in correcting the errors by utilizing software in a later stage. In addition, since the lenses 1 need to be preset in the lens barrel 3 in advance and preset the lens barrel 3 on the base 4, so an additional sealing structure is necessary to seal the gap between the lens barrel 3 and other structural portions of the fixing base 2. Although the seal between the lens barrel 3 and the base 4 can be enhanced by the screw connection, the glue adhesion and the interference fit, a looseness between the lens barrel 3 and the base 4 is inevitably produced and a deviation between the optical axis A and the mechanical axis B of the optical lens assembly is resulted, the imaging quality of the imaging system using the optical lens assembly is eventually impacted and decreased, with long-term use. Further, the optical lens assembly having a plurality of individual components assembled as described above further requires that the thermal expansion coefficient of the lens barrel 3 and the base 4 is identical, or as close as possible, so as to avoid the tight binding between the lens barrel 3 and the base 4 being broken and the deviation between the optical axis A and the mechanical axis B of the optical lens assembly being produced when environmental temperature changes. Finally, many separate components of existing optical lens assembly require their respective process steps to be fabricated and assembled in multiple steps, which inevitably leads to an increase in the manufacturing cost of the optical lens assembly.

SUMMARY OF THE PRESENT INVENTION

The main object of the present invention is to provide an optical lens assembly for a vehicular optical imaging system, wherein the optical lens assembly does not need any additional sealing mechanism in ensuring the lens unit of the optical lens assembly to be sealed on the holder of the optical lens assembly.

Another object of the present invention is to provide an optical lens assembly for use in a vehicular optical imaging system, wherein the optical lens assembly has a simpler construction and does not require a plurality of separate components to be assembled, so as to reduce the process steps for manufacturing the optical lens assembly.

Another object of the present invention is to provide an optical lens assembly for a vehicular optical imaging system, wherein the holder of the optical lens assembly is integrally formed so that the holder has a good uniformity and the mechanical axis of the holder can be determined, so as to minimize the deviation between the mechanical axis and the optical axis of the optical lens assembly.

Another object of the present invention is to provide an optical lens assembly for a vehicular optical imaging system, wherein the receiving portion and the positioning portion of the holder of the optical lens assembly are integrated with each other, wherein the and the receiving portion of the holder is provided for placing the lens unit therein, and the positioning portion of the holder is provided for positioning the lens unit at an appropriate position.

Another object of the present invention is to provide an optical lens assembly for a vehicular optical imaging system, wherein the receiving portion for placing the lens unit therein and the positioning portion for positioning the lens unit are integrated with the base of the holder without any additional sealing mechanism. Hence, the process steps for manufacturing the optical lens assembly can be additionally reduced and to reduce the manufacturing cost thereof. At the same time, the mechanical axis of the optical lens assembly can be fixed and the deviation between the mechanical axis and the optical axis of the optical lens assembly is minimized as much as possible. In addition, since the mechanical axis of the optical lens assembly is fixed, the sensor of the optical imaging system employing the optical lens assembly is easier to be provided in the mechanical axis and so that the sensor can receive the imaging light at a predetermined angle.

Another object of the present invention is to provide an optical lens assembly for a vehicular optical imaging system, wherein the holder of the optical lens assembly defines an optical chamber, and the optical chamber has an inner diameter becoming smaller from top to bottom, and so as to allow the lenses of the lens unit of the optical lens assembly to be disposed in the optical chamber from bottom to top.

Another object of the present invention is to provide an optical lens assembly for a vehicular optical imaging system, wherein the holder of the optical lens assembly forms a positioning portion, a receiving portion extended downwardly from the positioning portion and a base and extended downwardly and outwardly from the receiving portion, wherein the positioning portion and the receiving portion of the holder are provided to be capable of stably holding the lens unit in the optical chamber. Preferably, the positioning portion and the receiving portion of the holder are integrated with each other. Optionally, and the base and the receiving portion of the holder are integrated with each other. More preferably, the positioning portion, the receiving portion and the base of the holder are integrated.

Another object of the present invention is to provide an optical lens assembly for a vehicular optical imaging system, wherein the holder of the optical lens assembly forms a positioning portion, a receiving portion extended downwardly from the positioning portion and a base and extended downwardly and outwardly from the receiving portion, wherein the positioning portion of the holder is sealedly provided on an outer surface of a front lens of the lens unit along an outer periphery of the front lens of the lens unit of the optical lens assembly, so as to hold sealedly the lens unit in the optical chamber.

Another object of the present invention is to provide an optical lens assembly, wherein the optical lens assembly does not require sophisticated components and a complicated structure, and it has a simple manufacturing process and a low cost.

Additional advantages and features of the invention will become apparent from the description which follows, and may be realized by means of the instrumentalities and combinations particular point out in the appended claims.

According to the present invention, the foregoing and other objects and advantages are attained by an optical lens assembly, which comprising:

a lens unit, wherein the lens unit includes at least a front lens and a rear lens; and a holder, wherein the holder comprises a positioning portion and a receiving portion extended downwardly from the positioning portion, wherein the positioning portion and the receiving portion of the holder are integrated with each other, wherein the receiving portion defines an optical chamber, and the lens unit is and provided in the optical chamber, wherein the optical chamber allows imaging light to enter into and pass through the lens unit and, wherein the positioning portion is sealedly disposed on an outer surface of the front lens along an outer periphery of the front lens.

The present invention further provides a holder for an optical lens assembly of a vehicular optical imaging system, wherein the holder can be integrally molded, for example integrally molded by injection molding, wherein the holder forms a positioning portion, a receiving portion extended downwardly from the positioning portion and a base and extended downwardly and outwardly from the receiving portion, wherein the receiving portion defines an optical chamber and the lens unit is adapted for being provided in the optical chamber, wherein the optical chamber allows imaging light to enter into and pass through the lens unit and, wherein the positioning portion is sealedly disposed on an outer surface of the front lens along an outer periphery of the front lens.

The present invention further provides a method for manufacturing an optical lens assembly having an optical chamber for placing the lens unit of the optical lens assembly and therein, wherein the optical chamber allows imaging light to enter into and pass through the lens unit, which comprising the following steps:

A) molding integrally a holder and a base, wherein the holder forms a positioning portion and a receiving portion extended downwardly from the positioning portion, and the receiving portion defines an optical chamber;

B) arranging the receiving portion of the holder on the base; and

C) placing the lens unit in the optical chamber of the holder from bottom to top and pressing an outer surface of the front lens of the lens unit against on the positioning portion.

The present invention further provides a method for manufacturing an optical lens assembly, comprising the steps of:

A) molding integrally a holder and a base, the holder forms a positioning portion, a receiving portion extended downwardly from the positioning portion and a base extended downwardly and outwardly from the receiving portion, wherein the receiving portion defines an optical chamber for receiving the lens unit of the optical lens assembly therein, wherein the optical chamber allows imaging light to enter into and pass through the lens unit;

B) placing the lens unit in the optical chamber of the holder from bottom to top and pressing an outer surface of the front lens of the lens unit against on the positioning portion; and C) sealing at least one holding portion on an outer surface of the rear lens of the lens unit of the optical lens assembly therein, so as to retaining the lens unit in the optical chamber of the holder of the optical lens assembly. In other words, the holder of the optical lens assembly further comprises at least one holding portion provided on an inner wall of the optical chamber to hold the lens unit in the optical chamber of the holder of the optical lens assembly. Preferably, the holding portion is integrally extended inwardly and downwardly from the inner wall of the optical chamber.

The present invention further provides a method for manufacturing an optical lens assembly having an optical chamber for placing the lens unit of the optical lens assembly therein, wherein the optical chamber allows imaging light to enter into and pass through the lens unit, which comprising the following steps:

A) and molding integrally a holder and a base, wherein the holder forms a positioning portion and a receiving portion extended downwardly from the positioning portion, and the receiving portion defines an optical chamber and at least one holding portion extended from an inner wall of the optical chamber;

B) arranging the receiving portion of the holder on the base;

C) placing the lens unit in the optical chamber of the holder from bottom to top and pressing an outer surface of the rear lens of the lens unit against on the holding portion of the receiving portion; and D) fusing thermally the positioning portion of the holder of the optical lens assembly to form a positioning ring and positioning sealedly the positioning ring on an outer surface of the front lens along the outer periphery of the front lens of the lens unit of the optical lens assembly so that the lens unit is sealedly and stably held between the positioning ring and the positioning portion of the holder.

The present invention further provides a method for manufacturing an optical lens assembly, comprising the steps of:

A) molding integrally a holder, wherein the holder forms a positioning portion, a receiving portion extended downwardly from the positioning portion, a base extended downwardly and outwardly from the receiving portion and at least one holding portion, wherein the receiving portion defines an optical chamber for placing the lens unit of the optical lens assembly therein, wherein the holding portion is extended from an inner wall of the optical chamber, wherein the optical chamber allows imaging light to enter into and pass through the lens unit;

B) placing the lens unit in the optical chamber of the holder from bottom to top and pressing sealedly an outer surface of the rear lens of the lens unit against on the holding portion; and D) fusing thermally the positioning portion of the holder of the optical lens assembly to form a positioning ring and positioning sealedly the positioning ring on an outer surface of the front lens along the outer periphery of the front lens of the lens unit of the optical lens assembly so that the lens unit is sealedly and stably held between the positioning ring and the positioning portion of the holder.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 6 is a flow chart of another method of manufacturing the optical lens assembly according to the above preferred embodiment of the present invention.

FIG. 8 is a flow chart of another method for manufacturing the optical lens assembly according to the above preferred embodiment of the present invention.

DETAILED DESCRIPTION OF THE PREFERRED EMBODIMENT

Figure 1:
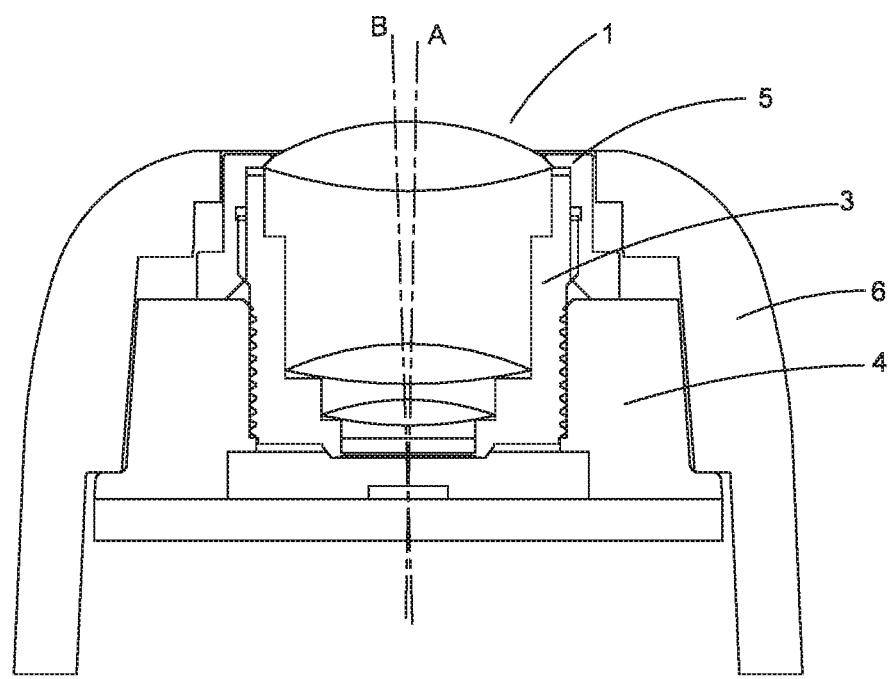
FIG. 1 is a sectional view of a conventional optical lens assembly.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIGS. 2A to 2D of the drawings of the present invention, an optical lens assembly of the present invention comprises a lens unit 10 and a holder 20, which can be used for a vehicular optical imaging system, and wherein the lens unit 10 comprises a front lens 11' and a rear lens 11", and the holder 20 comprises a positioning portion 21 and a receiving portion 22 which is extended downwardly from the positioning portion 21. The positioning portion 21 and the receiving portion 22 are integrated with each other, wherein the receiving portion 22 forms a light chamber 220 therein, and the lens unit 10 is provided in the light chamber 220 which allows imaging lights to enter into and pass through the lens unit 10, wherein the positioning portion 21 is sealedly provided on an outer surface 110' of the font lens 11' along an outer periphery 111' of the font lens 11' of lens unit 10. In other words, the lens unit 10 comprises a plurality of lenses 11, and the lenses 11 and defines a font lens 11' and a rear lens 11". Preferably, the outer periphery 111' of the front lens 11' of the lens unit 10 is sealedly provided against on the positioning portion 21 of the holder 20.

Figure 2A:
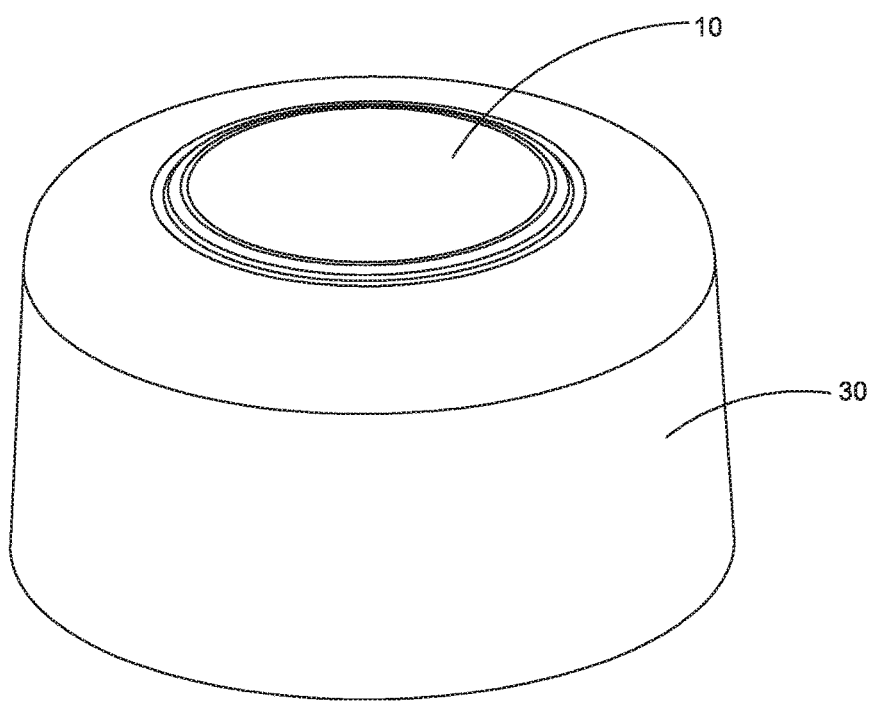
FIG. 2A is a front view of an optical lens assembly according to a preferred embodiment of the present invention.
Figure 2B:
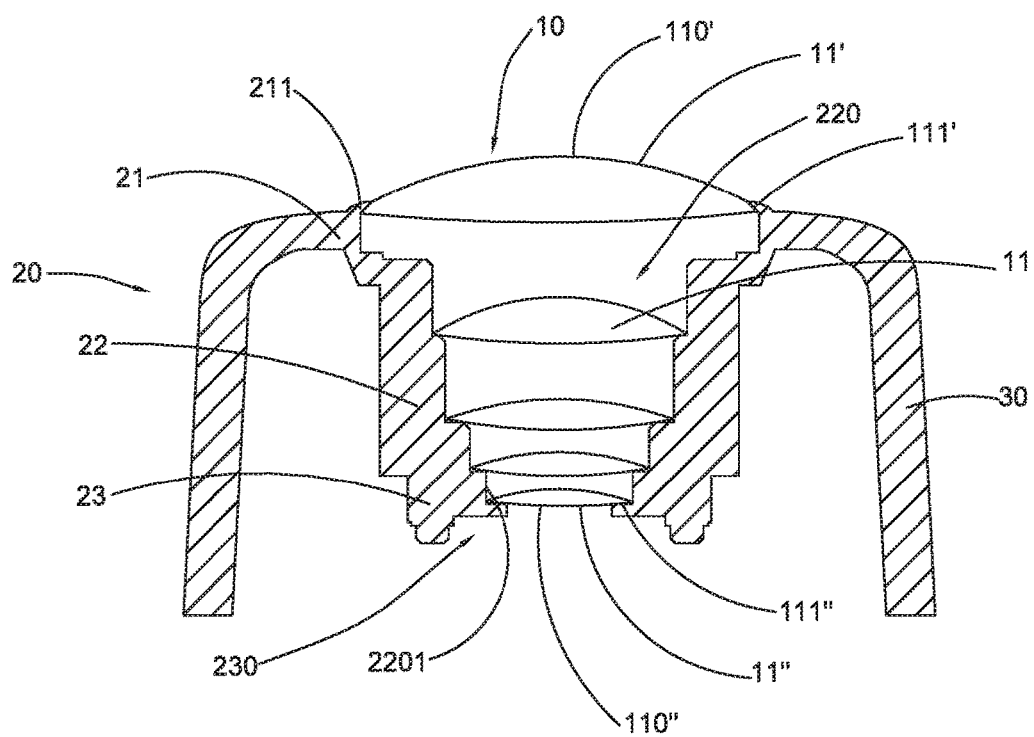
FIG. 2B is a sectional view of the optical lens assembly according to the above preferred embodiment of the present invention.

As shown in FIGS. 2A and 2B, the holder 20 further comprises a base 23 extended downwardly from the receiving portion 22, wherein the base 23 is integrated with the receiving portion 22. Preferably, the base 23 forms a receiving chamber 230 which is communicated with the light chamber 220 of the receiving portion 22 so that the sensor and signal module of the imaging system employing the optical lens assembly of the present invention can be arranged in the receiving chamber 230.

As shown in FIGS. 2A to 2D, the positioning portion 21 of the holder 20 comprises a positioning ring 211, wherein the positioning ring 211 is sealedly provided on the outer periphery 111' of the front lens 11' along the outer periphery 111' of the front lens 11' of the lens unit 10.

It is appreciated that when the receiving portion 22 of the holder 20 is integrated with the base 23, an mechanical axis of the holder 20 can be determined so that it is easier to ensure an optical axis of the lens unit 10 and an mechanical axis of the holder 20 are coincided with each other, or to minimize the deviation between the optical axis of the lens unit 10 and the mechanical axis of the holder 20 as far as possible. Generally speaking, an optical imaging system for optical imaging still requires an optical sensor to receive imaging optical signal and to generate imaging signal, and a signal processing module which is electronically connected with the optical sensor to receive the imaging signal generated by the sensor and process it. Preferably, the optical sensor is provided in the optical axis of the lens unit 10 and faces the lens unit 10 to receive imaging optical signal. Therefore, when the base 23 of the holder 20 and the receiving portion 22 are integrated with each other, the optical sensor of the imaging system can be guided and easily be located and at a proper position. In addition, since the mechanical axis of the holder 20 has been determined, when the optical lens assembly is manufactured, the deviation between the optical axis of the lens unit 10 and the mechanical axis of the holder 20 is easier to be reduced.

It is worth mentioning that the positioning portion 21 of the holder 20, the receiving portion 22 and the base 23 can be independent elements and be integrally assembled by a later process. It's also feasible to mold integrally the holder 20 defining the positioning portion 21, the receiving portion 22 and the base 23. In other words, the positioning portion 21, the receiving portion 22 and the base 23 may be independent components, or a part of the holder 20 respectively.

Figure 2C:
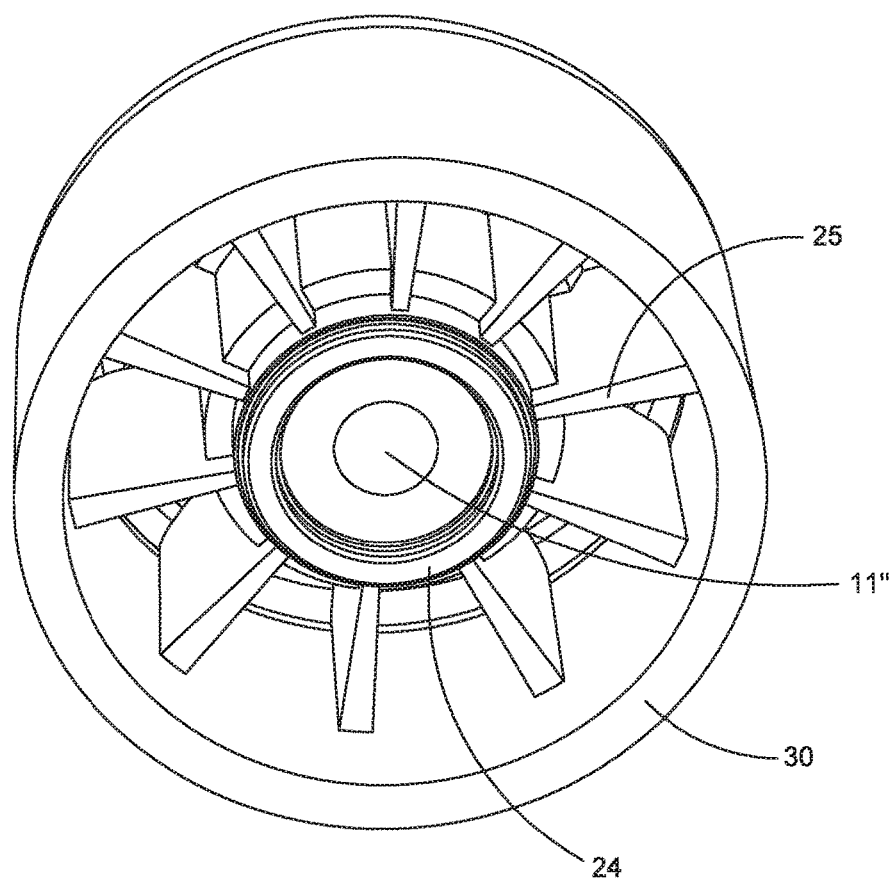
FIG. 2C is a bottom view of the receiving portion of the optical lens assembly according to the above preferred embodiment of the present invention.
Figure 2D:
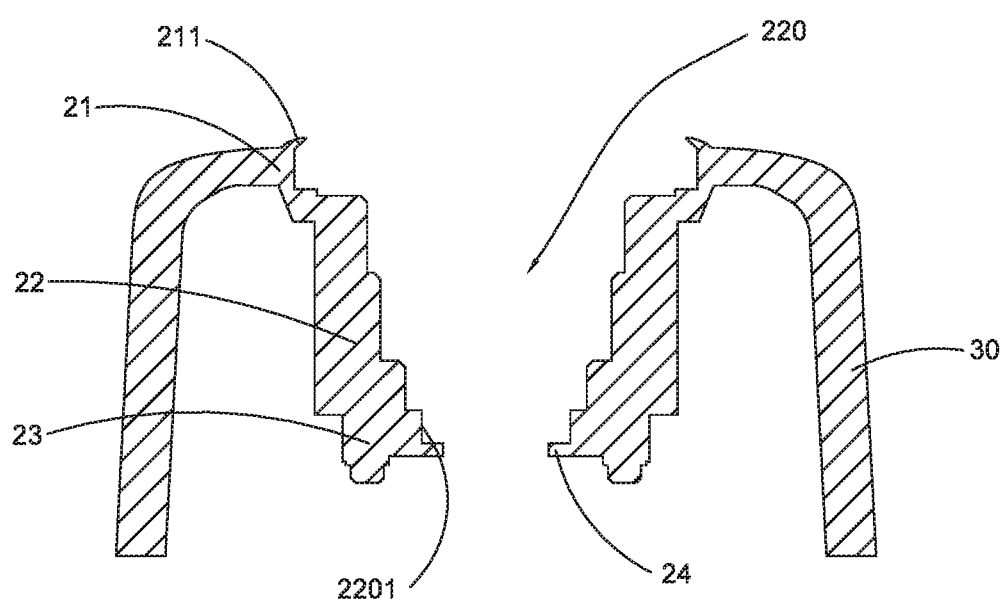
FIG. 2D is a sectional view of the receiving portion of the optical lens assembly according to the above preferred embodiment of the present invention.
Figure 2E:
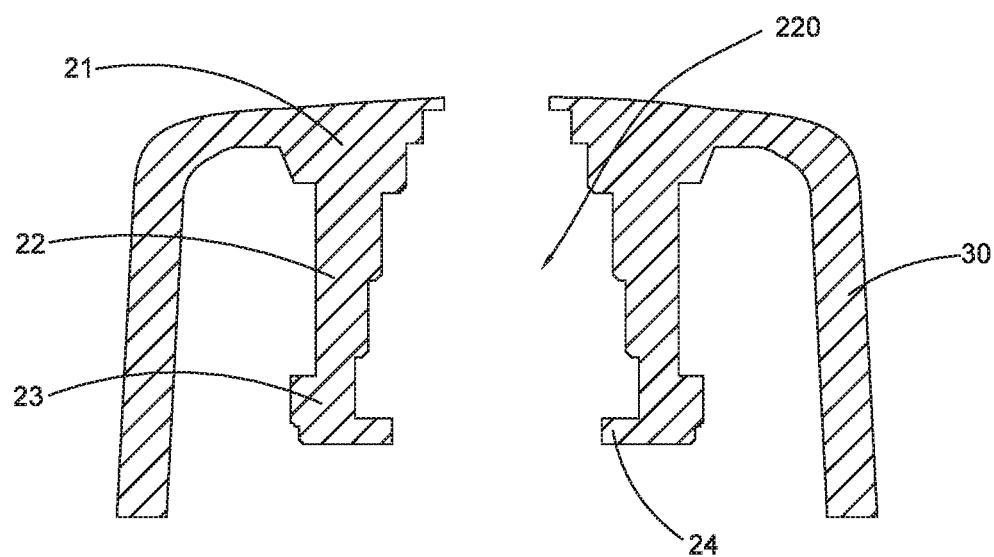
FIG. 2E is a sectional view of an alternative mode of the receiving portion of the optical lens assembly according to the above preferred embodiment of the present invention.

As shown in FIG. 2D, an inner diameter of the light chamber 220 of the receiving portion 22 of the holder 20 becomes smaller from top to bottom to allow the lenses of the lens unit 10 to be installed in the light chamber 220 from top to bottom in sequence. Optionally, the inner diameter of the light chamber 220 of the receiving portion 22 of the holder 20 becomes larger from top to bottom to allow the lenses of the lens unit 10 to be installed in the light chamber 220 from bottom to top in sequence, as shown in FIG. 2E. In other words, the light chamber 220 of the receiving portion 22 of the holder 20 allows the lenses 11 of the lens unit 10 to be arranged within the light chamber 220 directly. One skilled in the art will understand that the lenses 11 of the lens unit 10 can be preset as a lens group in sequence and be placed in the light chamber 220 all at once.

As shown in FIGS. 2A and 2B, the holder 20 further comprises a holding portion 24, wherein the light chamber 220 of the receiving portion 22 has an inner wall 2201, wherein the holding portion 24 is extended from the inner wall 2201 of the light chamber 220 of the receiving portion 22, wherein the holding portion 24 is sealedly provided against the rear lens 11" of the lens unit 10. In other words, the holding portion 24 is provided against on an outer surface 110" of the rear lens 11" of the lens unit 10. Preferably, the holding portion 24 is provided on the outer surface 110" of the rear lens 11" along the outer periphery 111" of the rear lens 11" of the lens unit 10. One skilled in the art will understand that the lens unit 10 may only have the lens 11, and the lens 11 respectively defines the outer surfaces 111', 110". One skilled in the art will understand that the positioning portion 21 and the holding portion 24 of the holder 20 define a holding mechanism, so as to make the lens unit 10 keep axially at a proper position. Preferably, the receiving portion 22 of the holder 20 is provided to keep radially the lens unit 10 at a proper position.

Alternatively, the holding portion 24 of the holder 20 is provided at a central portion of the inner wall 2201 of the light chamber 220 of the receiving portion 22 of the holder 20, and the inner diameter of the light chamber 220 of the receiving portion 22 becomes larger from bottom to top, or becomes larger from top to bottom from the holding portion 24, so as to allow the lenses of the lens unit 10 to be arranged in the light chamber 220 from top to bottom, or from bottom to top.

As shown in FIG. 2A and FIG. 2B, the optical lens assembly according to the preferred embodiment of the present invention further comprises a casing 30, wherein the casing 30 is provided on an outer surface of the holder 20 to make the holder 20 be shielded inside the casing 30. One skilled in the art will understand that the casing 30 can receive the positioning portion 21, the receiving portion 22 and the base 23 therein, so as to make the optical lens assembly have a predetermined shape and provide protection for the positioning portion 21, receiving portion 22, and base 23. Furthermore, the casing 30 further provides the dust-proof function for the optical lens assembly of the present invention.

As shown in FIG. 2C, the holding portion 20 of the optical lens assembly according to the preferred embodiment of the present invention further comprises a plurality of strengthening ribs 25, wherein each of the strengthening ribs 25 is provided between the casing 30 and the holding portion 24 of the holder 20 to retain the holding portion 24 at an appropriate position. Preferably, the strengthening ribs 25 are extended from the positioning portion 21 to the holding portion 24 of the holder 20 from top to bottom.

One skilled in the art will understand that, the sensor (or optical sensor) for sensing imaging light and the signal module (e.g. Printed Circuit Board and Integrated Circuit Board) for receiving sensing signal from the sensor can be provide in the receiving chamber 230 formed by the base 23 (or casing 30), and the sensor is provided to face the outer surface 110" of the rear lens 11" of the lens unit 10 to receive the imaging light through the lens unit 10.

Figure 3A:
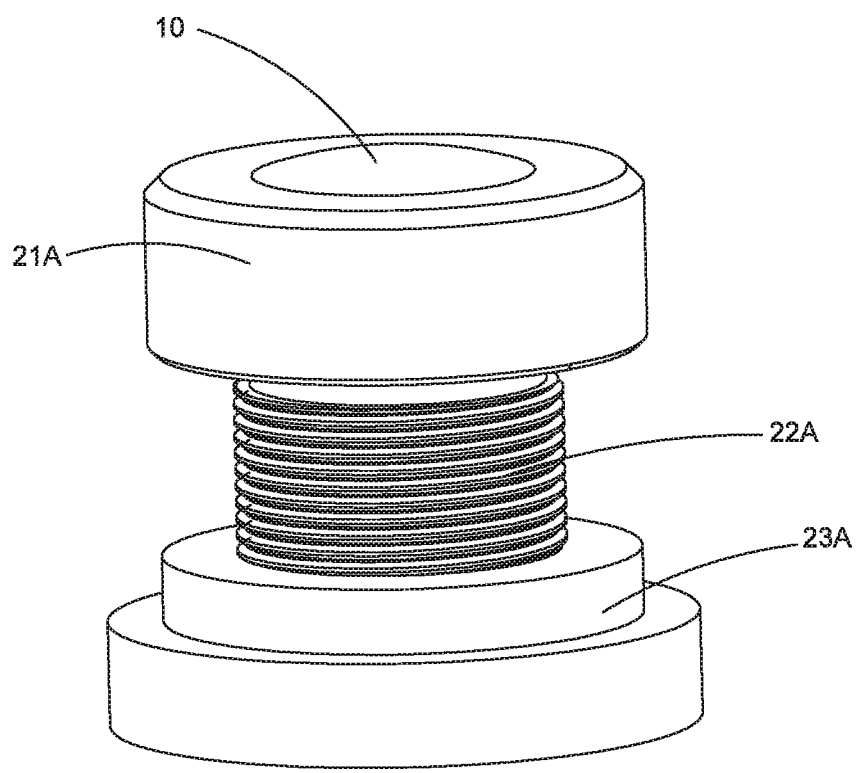
FIG. 3A is a front view of an alternative mode of the holder of the optical lens assembly according to the above preferred embodiment of the present invention.
Figure 3B:
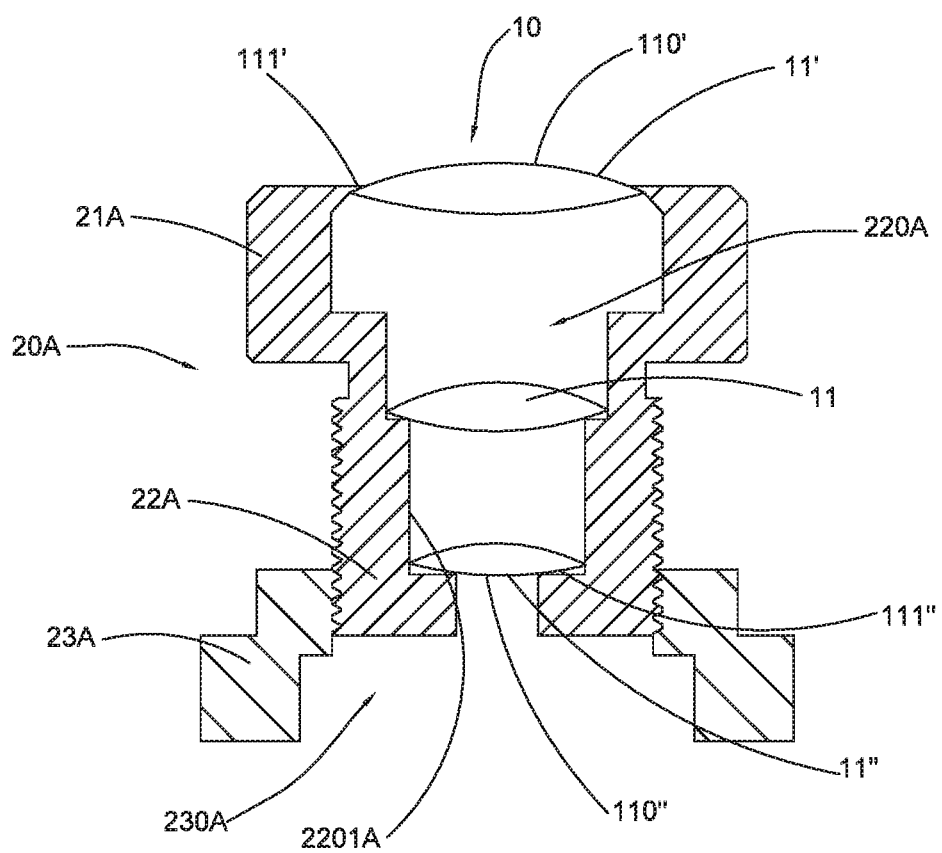
FIG. 3B is a sectional view of an alternative mode of the holder of the optical lens assembly according to the above preferred embodiment of the present invention.

FIGS. 3A and 3B illustrate an alternative mode of the holder 20 according to the preferred embodiment of the present invention, wherein the holder 20A comprises a positioning portion 21A, a receiving portion 22A extended downwardly from the positioning portion 21A and a base 23A extended downwardly from the receiving portion 22A, wherein the positioning portion 21A and the receiving portion 22A are integrated with each other, and the receiving portion 22A is coupled with the base 23A. In other words, the base 23A is connected with the receiving portion 22A, as an independent element. Preferably, the receiving portion 22A is connected with the base 23A by a physical connection, for example, the receiving portion 22A and the base 23A are screwed together. In other embodiments, the receiving portion 22A can be connected with the base 23A by interference fitting. In still other embodiments, the receiving portion 22A can be glued with the base 23A. One skilled in the art will understand that the receiving portion 22A and the base 23A can be connected by the combination of the above physical connections.

It is appreciated that, generally, when the base 23A is connected with the receiving portion 22A, as the independent element, the base 23A forms a receiving chamber 230A which is communicated with the light chamber 220A of the receiving portion 22A, so as to permit the image light to pass through the lens unit 10 in the light chamber 220A and sensed by the sensor within the receiving chamber 230A.

Figure 4A:
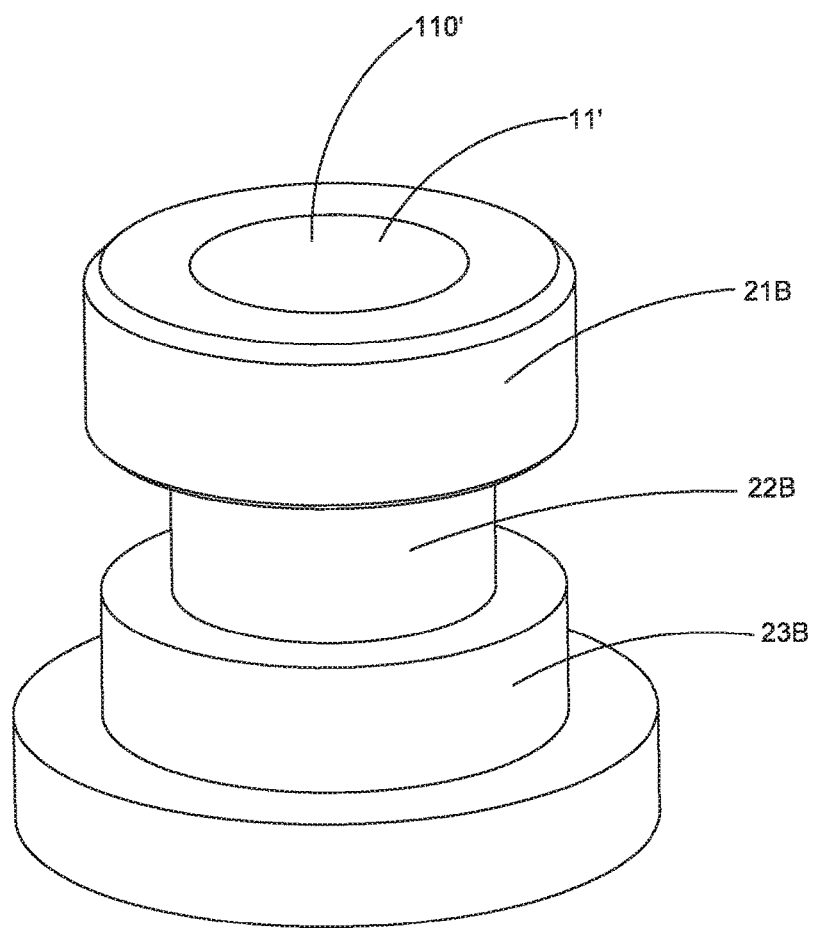
FIG. 4A is a front view of another alternative mode of the holder of the optical lens assembly according to the above preferred embodiment of the present invention.
Figure 4B:
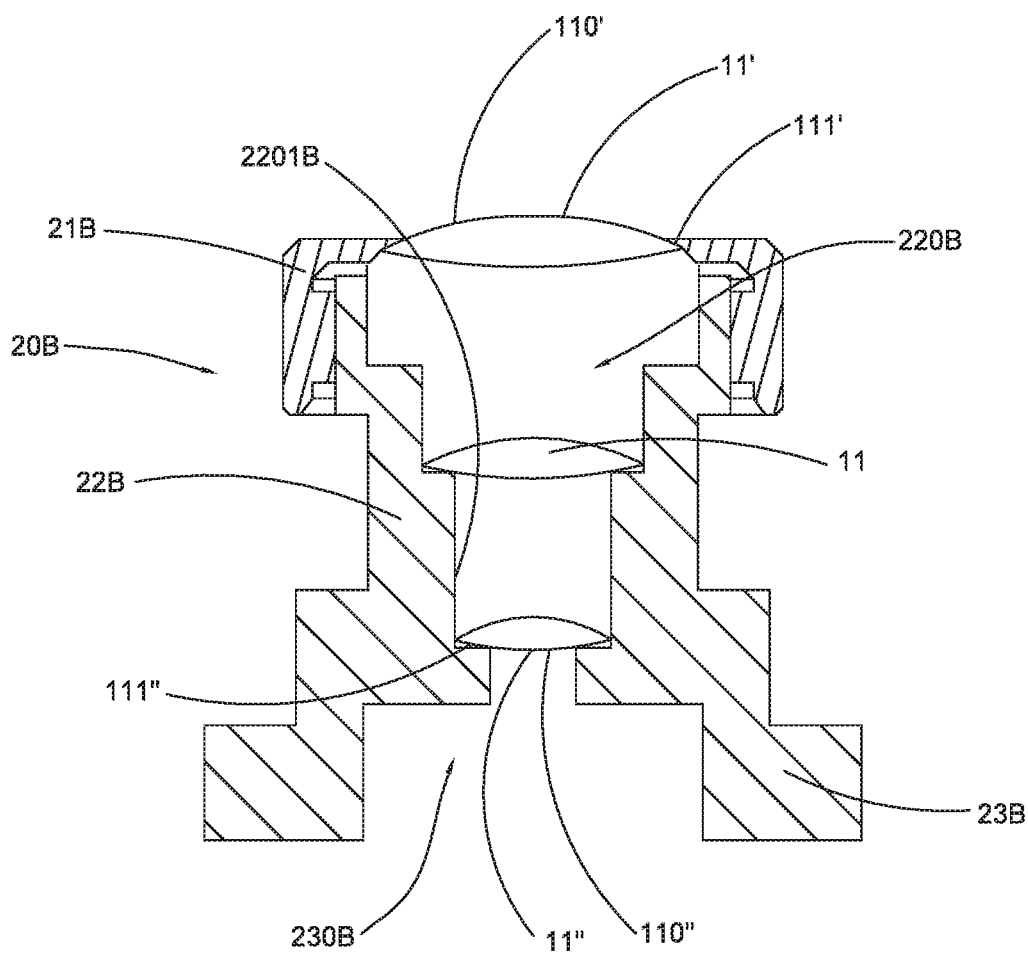
FIG. 4B is a sectional view of the alternative mode of the holder of the optical lens assembly according to the above preferred embodiment of the present invention.

FIGS. 4A and 4B illustrate another alternative mode of the holder 20 according to the preferred embodiment of the present invention, wherein the holder 20B comprises a positioning portion 21B, a receiving portion 22B extended downwardly from the positioning portion 21B and a base 23B extended downwardly from the receiving portion 22B, wherein the receiving portion 22B and the base 23B are integrated with each other, and the receiving portion 22B is coupled with the positioning portion 21B. In other words, the positioning portion 21B is connected with the receiving portion 22B, as an independent element. In another embodiment, the receiving portion 22B is connected with the positioning portion 21B through a physical connection such as thread connection. In another embodiment, the receiving portion 22B is connected with the positioning portion 21B by interference fitting. In still other embodiments, the receiving portion 22B is connected with the positioning portion 21B by gluing. One skilled in the art will understand that the receiving portion 22B and the positioning portion 21B can be connected by the combination of the above physical connections.

Figure 5:
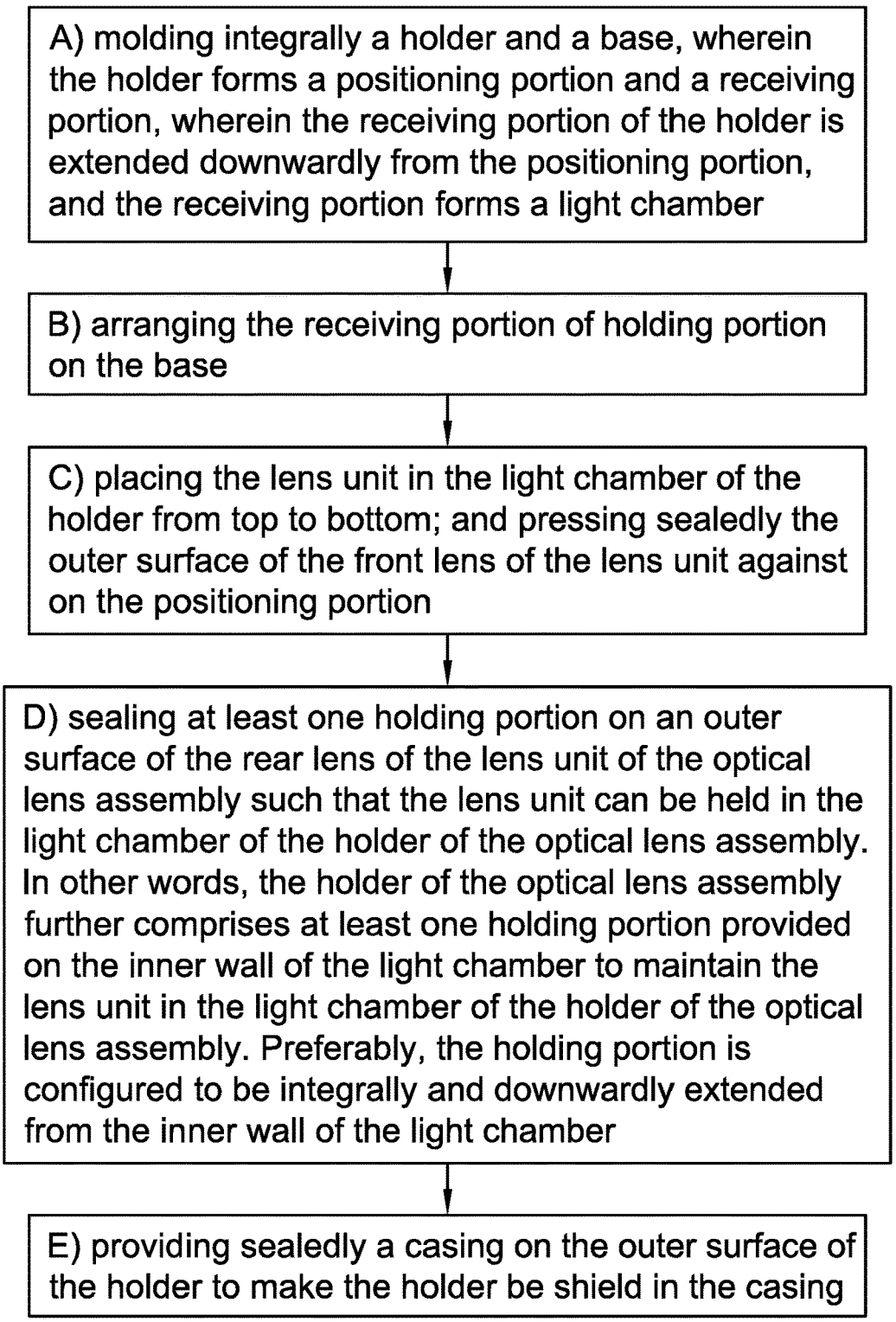
FIG. 5 is a flow chart of a method for manufacturing optical lens assembly according to the above preferred embodiment of the present invention.

As shown in FIG. 5, the present invention further provides a method for manufacturing an optical lens assembly, wherein the optical lens assembly has a light chamber for receiving the lens unit therein, wherein the light chamber allows the imaging light to go through the lens unit, which comprising the steps of:

A) molding integrally a holder and a base, wherein the holder forms a positioning portion and a receiving portion, wherein the receiving portion of the holder is extended downwardly from the positioning portion, and the receiving portion forms a light chamber;

B) arranging the receiving portion of holding portion on the base; and

C) placing the lens unit in the light chamber of the holder from top to bottom; and pressing sealedly the outer surface of the front lens of the lens unit against on the positioning portion.

One skilled in the art will understand that the holder and the base can be integrally mold respectively, for example, by injection molding or casting molding. Therefore, the holder and the base can be made by plastic or metal material. Preferably, each of the lenses of the lens unit is placed in the light chamber of the holder from bottom to top. More preferably, the inner diameter of the light chamber becomes smaller from bottom to top. Most preferably, the size of the inner diameter of the light chamber is reduced stepwise from bottom to top. Alternatively, the holding portion of the holder can be arranged on the central portion of the inner wall of the light chamber of the receiving portion, and the inner diameter of the light chamber becomes larger from the holding portion from bottom to top and becomes larger from the holding portion from top to bottom, so as to allow the lenses of the lens unit to be provided respectively in the light chamber from top to bottom or from bottom to top.

Moreover, the method for manufacturing the optical lens assembly further comprises the following step:

D) sealing at least one holding portion on an outer surface of the rear lens of the lens unit of the optical lens assembly such that the lens unit can be held in the light chamber of the holder of the optical lens assembly. In other words, the holder of the optical lens assembly further comprises at least one holding portion provided on the inner wall of the light chamber to maintain the lens unit in the light chamber of the holder of the optical lens assembly. Preferably, the holding portion is configured to be integrally and downwardly extended from the inner wall of the light chamber.

Furthermore, the method for manufacturing the optical lens assembly further comprises the following step:

E) providing sealedly a casing on the outer surface of the holder to make the holder be shield in the casing.

As shown in FIG. 6, the present invention further provides a method for manufacturing an optical lens assembly, which comprising the following steps:

A) molding integrally a holder and a base, wherein the holder forms a positioning portion, a receiving portion extended downwardly from the positioning portion and a base extended downwardly and outwardly from the receiving portion, wherein the receiving portion defines an optical chamber for receiving the lens unit of the optical lens assembly therein, wherein the optical chamber allows the imaging light to enter into and pass through the lens unit;

B) arranging the lens unit in the optical chamber of the holder from bottom to top and pressing an outer surface of the front lens of the lens unit against on the positioning portion; and C) sealing at least one holding portion on an outer surface of the rear lens of the lens unit of the optical lens assembly therein, so as to retaining the lens unit in the optical chamber of the holder of the optical lens assembly. In other words, the holder of the optical lens assembly further comprises at least one holding portion provided on an inner wall of the optical chamber to hold the lens unit in the optical chamber of the holder of the optical lens assembly. Preferably, the holding portion is integrally extended inwardly and downwardly from the inner wall of the optical chamber.

One skilled in the art will understand that the holder and the base can be integrally mold respectively, for example, by injection molding or casting molding. Therefore, the holder and the base can be made by plastic or metal material. Preferably, each of the lenses of the lens unit is placed in the light chamber of the holder from bottom to top. More preferably, the inner diameter of the light chamber becomes smaller from bottom to top. Most preferably, the size of the inner diameter of the light chamber is reduced stepwise from bottom to top.

The manufacturing method for the optical lens assembly further comprises the following step:

D) providing sealedly a casing on the outer surface of the holder to make the holder be shield in the casing.

Figure 7:
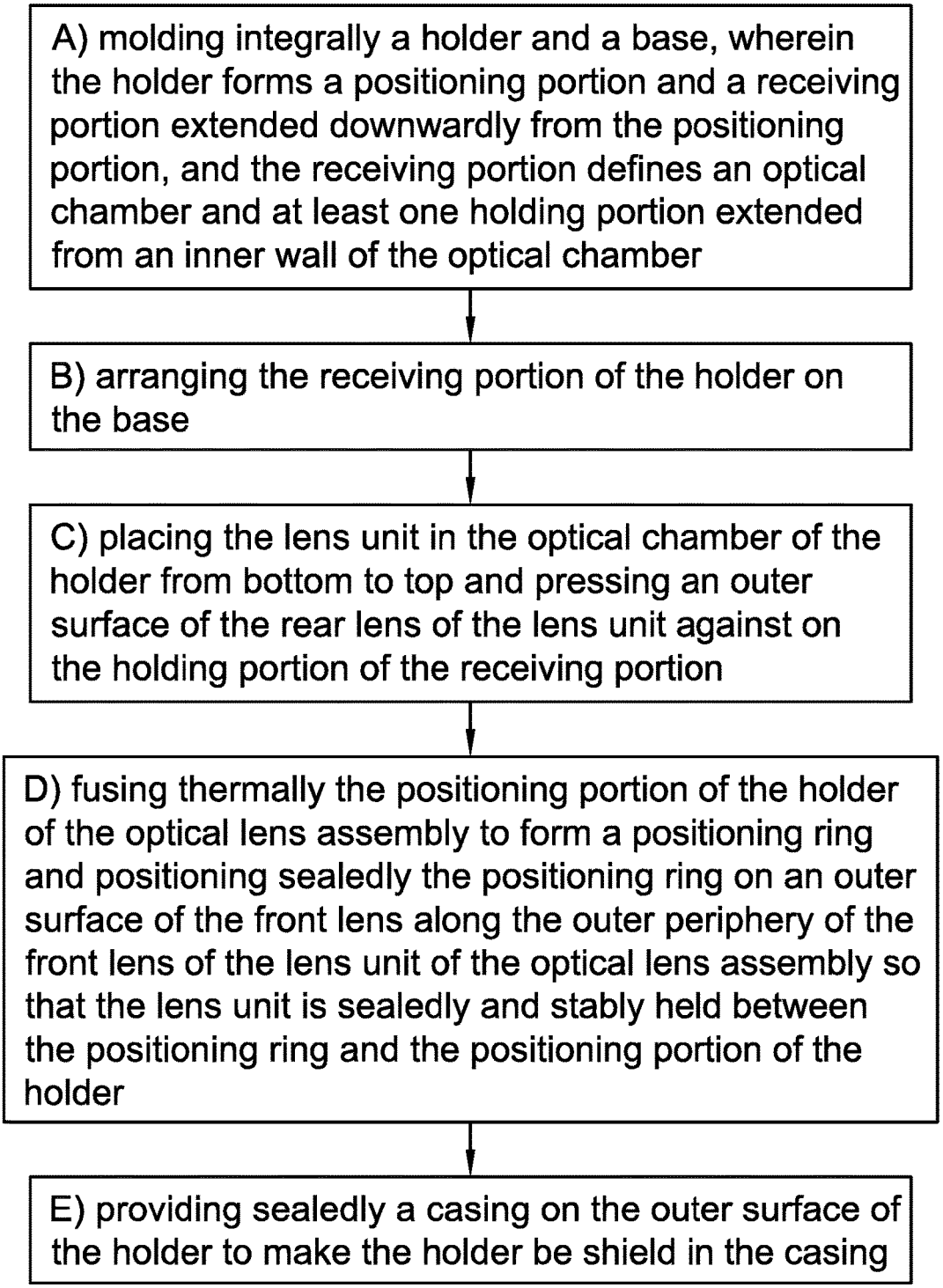
FIG. 7 is a flow chart of another method for manufacturing the optical lens assembly according to the above preferred embodiment of the present invention.

As shown in FIG. 7, the invention further provides a method for manufacturing an optical lens assembly, wherein the optical lens assembly has a light chamber for receiving the lens unit of the optical lens assembly therein, and the light chamber allows the imaging light to enter into and pass through the lens unit, which comprising the following steps:

A) molding integrally a holder and a base, wherein the holder forms a positioning portion and a receiving portion extended downwardly from the positioning portion, and the receiving portion defines an optical chamber and at least one holding portion extended from an inner wall of the optical chamber;

B) arranging the receiving portion of the holder on the base;

C) placing the lens unit in the optical chamber of the holder from bottom to top and pressing an outer surface of the rear lens of the lens unit against on the holding portion of the receiving portion; and D) fusing thermally the positioning portion of the holder of the optical lens assembly to form a positioning ring and positioning sealedly the positioning ring on an outer surface of the front lens along the outer periphery of the front lens of the lens unit of the optical lens assembly so that the lens unit is sealedly and stably held between the positioning ring and the positioning portion of the holder.

One skilled in the art will understand that the holder and the base can be integrally mold respectively, for example, by injection molding or casting molding. Therefore, the holder and the base can be made by plastic or metal material. Preferably, each of the lenses of the lens unit is placed in the light chamber of the holder from top to bottom. More preferably, the inner diameter of the light chamber becomes smaller from top to bottom. Most preferably, the size of the inner diameter of the light chamber is reduced stepwise from top to bottom. Alternatively, the holding portion of the holder is formed by the lower end of the receiving portion.

The method for manufacturing the optical lens assembly further comprises the following step:

E) providing sealedly a casing on the outer surface of the holder to make the holder be shield in the casing.

As shown in FIG. 8, the present invention further provides a method for manufacturing an optical lens assembly, which comprising the following steps:

A) molding integrally a holder, wherein the holder forms a positioning portion, a receiving portion extended downwardly from the positioning portion, a base extended downwardly and outwardly from the receiving portion and at least one holding portion, wherein the receiving portion defines an optical chamber for placing the lens unit of the optical lens assembly therein, wherein the holding portion is extended from an inner wall of the optical chamber, wherein the optical chamber allows imaging light to enter into and pass through the lens unit;

B) placing the lens unit in the optical chamber of the holder from bottom to top and pressing sealedly an outer surface of the rear lens of the lens unit against on the holding portion; and C) fusing thermally the positioning portion of the holder of the optical lens assembly to form a positioning ring and positioning sealedly the positioning ring on an outer surface of the front lens along the outer periphery of the front lens of the lens unit of the optical lens assembly so that the lens unit is sealedly and stably held between the positioning ring and the positioning portion of the holder.

One skilled in the art will understand that the holder and the base can be integrally mold respectively, for example, by injection molding or casting molding. Therefore, the holder and the base can be made by plastic or metal material. Preferably, each of the lenses of the lens unit is placed in the light chamber of the holder from top to bottom. More preferably, the inner diameter of the light chamber becomes smaller from top to bottom. Most preferably, the size of the inner diameter of the light chamber is reduced stepwise from top to bottom. Alternatively, the holding portion of the holder is formed by the lower end of the receiving portion.

Furthermore, the method for manufacturing optical lens assembly comprises the following step:

D) sealing a casing on the outer surface of the holder to shield the holder in the casing.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical lens assembly for vehicular optical imaging system, comprising:

a lens unit, wherein the lens unit comprises at least a front lens and a rear lens; and a holder, wherein the holder comprises a positioning portion, a receiving portion extended downwardly from the positioning portion and at least one holding portion, wherein the positioning portion and the receiving portion are integrated with each other, wherein the positioning portion, the receiving portion and the holding portion are integrally formed at the holder, wherein the receiving portion defines a light chamber, wherein the lens unit is provided in the light chamber, wherein the light chamber allows imaging light to enter thereinto and pass through the lens unit, wherein an inner diameter of the light chamber becomes larger from bottom to top that a diameter size of the positioning portion is larger than that of the receiving portion, and the diameter size of the receiving portion is larger than that of the holding portion, so as to allow the front and rear lenses being received in the light chamber from bottom to top, wherein an outer surface of the front lens is retained at the positioning portion that an outer periphery of the front lens is pressed and sealed at the positioning portion, wherein the light chamber has an inner wall, wherein an outer surface of the rear lens is retained at the holding portion that an outer periphery of the rear lens is pressed and sealed at the holding portion.

2. The optical lens assembly, as recited in claim 1, wherein the holder further comprises a base extended downwardly from the receiving portion, wherein the base is integrated with the receiving portion and forms a receiving chamber which is communicated with the light chamber of the receiving portion.

3. The optical lens assembly, as recited in claim 1, wherein the positioning portion of the holder comprises a positioning ring, wherein the positioning ring is sealed and pressed on the outer periphery of the front lens along the outer periphery of the front lens of the lens unit.

4. The optical lens assembly, as recited in claim 2, wherein the positioning portion of the holder comprises a positioning ring, wherein the positioning ring is sealed and pressed on the outer periphery of the front lens along the outer periphery of the front lens of the lens unit.

5. The optical lens assembly, as recited in claim 1, further comprising a casing and a plurality of strengthening ribs, wherein the casing is sealedly provided on an outer surface of the holder to hide the holder inside the casing, wherein each of the strengthening ribs is provided between the casing and the holding portion of the holder.

6. The optical lens assembly, as recited in claim 2, further comprising a casing and a plurality of strengthening ribs, wherein the casing is sealedly provided on an outer surface of the holder to hide the holder inside the casing, wherein each of the strengthening ribs is provided between the casing and the holding portion of the holder.

7. The optical lens assembly, as recited in claim 4, further comprising a casing and a plurality of strengthening ribs, wherein the casing is sealedly provided on an outer surface of the holder to hide the holder inside the casing, wherein each of the strengthening ribs is provided between the casing and the holding portion of the holder.

8. An optical lens assembly for vehicular optical imaging system, comprising:
a lens unit, wherein the lens unit comprises at least a front lens and a rear lens; and
a holder, wherein the holder comprises a positioning portion, a receiving portion extended downwardly from the positioning portion, at least one holding portion and a base extended from the receiving portion, wherein the receiving portion and the base are integrated with each other, wherein the positioning portion, the receiving portion and the holding portion are integrally formed at the holder, wherein the receiving portion defines a light chamber, wherein the lens unit is provided in the light chamber, wherein the light chamber allows imaging light to enter therein and pass through the lens unit, wherein an inner diameter of the light chamber becomes larger from top to bottom that a diameter size of the positioning portion is smaller than that of the receiving portion, and the diameter size of the receiving portion is smaller than that of the holding portion, so as to allow the front and rear lenses being received in the light chamber from top to bottom, wherein an outer surface of the front lens is retained at the positioning portion that an outer periphery of the front lens is pressed and sealed at the positioning portion, wherein the light chamber has an inner wall, wherein the holding portion is extended from the inner wall of the light chamber of the receiving portion, wherein an outer surface of the rear lens is retained at the holding portion that an outer periphery of the rear lens is pressed and sealed at the holding portion.

9. The optical lens assembly, as recited in claim 8, wherein the positioning portion of the holder comprises a positioning ring, wherein the positioning ring is sealed and pressed on the outer periphery of the front lens along the outer periphery of the front lens of the lens unit.

10. The optical lens assembly, as recited in claim 8, further comprising a casing and a plurality of strengthening ribs, wherein the casing is sealedly provided on an outer surface of the holder to hide the holder inside the casing, wherein each of the strengthening ribs is provided between the casing and the holding portion of the holder.

* * * * *